No. 630,043. Patented Aug. 1, 1899.
W. FOSTER.
AUTOMATIC TRAP AND PUMP REGULATOR.
(Application filed Apr. 20, 1899.)
(No Model.)
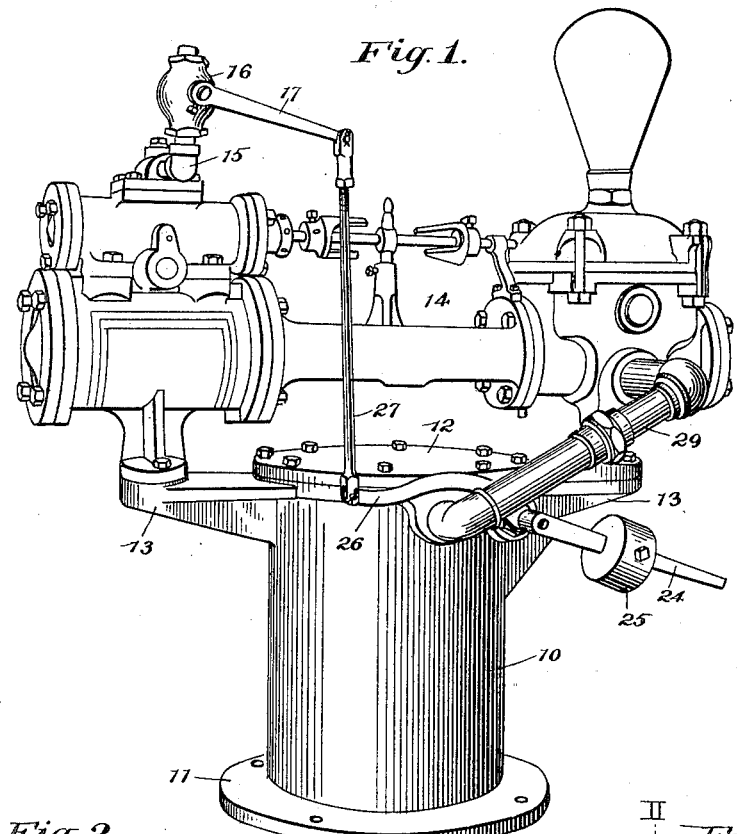
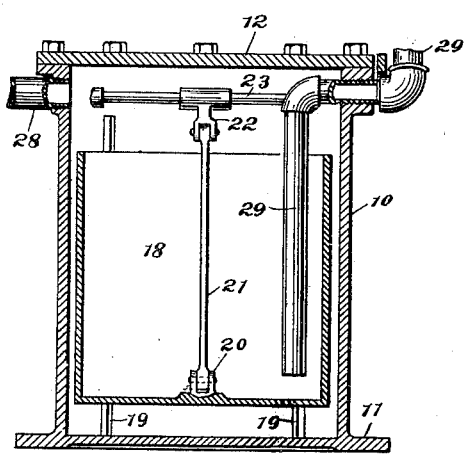
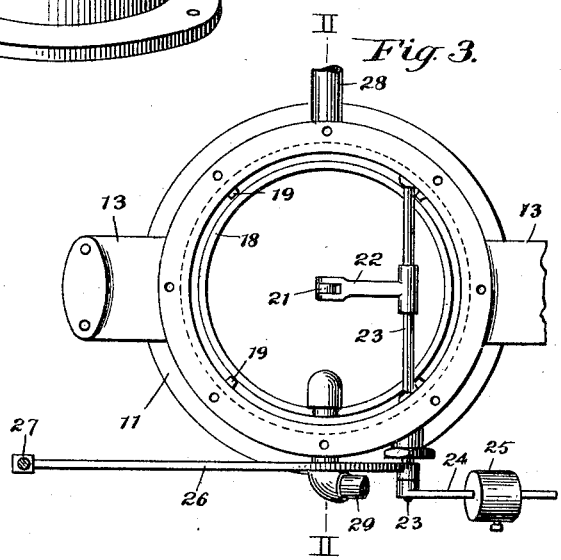
WITNESSES:
C. S. Cowley.
G. J. Carey.
INVENTOR
William Foster
BY
Hutchinson & Criswell,
ATTORNEYS

UNITED STATES PATENT OFFICE.

WILLIAM FOSTER, OF NEW YORK, N. Y., ASSIGNOR TO THE FOSTER PUMP WORKS, OF SAME PLACE.

AUTOMATIC TRAP AND PUMP-REGULATOR.

SPECIFICATION forming part of Letters Patent No. 630,043, dated August 1, 1899.

Application filed April 20, 1899. Serial No. 713,819. (No model.)

*To all whom it may concern:*

Be it known that I, WILLIAM FOSTER, of New York city, in the county of Kings and State of New York, have invented certain new and useful Improvements in Automatic Traps and Pump-Regulators, of which the following is a full, clear, and exact description.

My invention relates to improvements in traps and pump-regulators, and especially to that class of device which is used to receive the drainage or water of condensation from coils, radiators, drying-cylinders, and other receptacles or apparatus and pump the said water back into a boiler or other source of supply. There are numerous traps and automatic pumps for the purpose specified; but as a rule the pump and trap are separate structures, and frequently the trap is supported above or alongside the pump. Now it is well known that a pump is a piece of mechanism which often needs adjusting, packing, or repairing of some kind, and with the trap above or near the pump it is difficult to get at the latter, as the trap is more or less in the way. Moreover, the automatic action when the two parts are in the relative positions described is not as simple and positive as could be wished.

The object of my invention is to produce a trap of an extremely simple form, arrange the trap as a support for the pump, thus doing away with legs, which are sometimes used, and bringing the pump into an entirely free and accessible position, and also to produce actuating mechanism which is very simple and positive and by which when the trap is nearly full the pump will be set in motion, the trap relieved, and the pump again automatically stopped.

To these ends my invention consists of certain features of construction and combination of parts, which will be hereinafter fully described and claimed.

In the drawings, wherein similar numerals of reference designate similar parts, Figure 1 is a perspective view of my improved apparatus. Fig. 2 is a detail vertical section on the line II II of Fig. 3 of the trap, and Fig. 3 is a broken plan view of the trap with the pump and the trap-cover removed.

In carrying out my invention I make the trap 10 serve as a base or support for a pump. As illustrated, the trap is circular in cross-section, but its cross-sectional shape is immaterial, and it is provided with a base-flange 11 to give it a firm support; but the flange can be dispensed with. The trap is provided with a removable cover 12 and near the top with outwardly-extending arms 13, which are preferably integral with the trap and which form a support for the pump 14. Obviously if the trap were very large the arms would not be needed; but in any event the design illustrated can be departed from with pleasure without affecting the invention.

The pump 14 can be of any approved form and no novelty is here claimed for it, the pump having the customary steam-supply pipe 15 and the common form of valve 16, the stem of which can be worked by a lever 17 to open and close the valve.

Within the trap is a relatively large open-topped float 18, which is movable vertically and is prevented from too much lateral movement by the vertical guides 19, and in the bottom of the trap are ears 20, which connect by means of a suitable rod 21 with a crank-arm 22 above the float, this crank-arm being secured to a shaft 23, which is journaled transversely in the trap above the float and extends outward through a suitable stuffing-box in the side of the trap. It is obvious that the float may be given any necessary form, that the guides 19 may be dispensed with, and that any suitable flexible connection can be made between the float and the crank-arm 22. The shaft 23 has at its outer end an arm 24, which carries a counterbalance 25 to balance the float 18, and secured to the shaft 23, but extending opposite to the arm 24, is a crank 26, which connects by means of an adjustable rod 27 with the lever 17 of the steam-valve 16. The water or drainage of condensation, as the case may be, flows into the trap through a pipe 28, and the water is removed through a pipe 29, which extends downward into the float 18 and outward to the suction-chamber of the pump.

The operation of the apparatus is as follows: Normally the valve 16 is closed and the float is lifted somewhat, being balanced by the weight 25. As the water flows in through the pipe 28 it gradually fills the trap and finally overflows into the float 18. As this becomes full it moves down against the tension of the weight 25, and as it does so it tilts the crank 22 and shaft 23, thereby actuating the crank 26, rod 27, and lever 17, thus opening the valve 16 and starting the pump. When the pump is started, it of course pumps the water from the float 18, and as the latter becomes empty it again rises and, acting through the parts just referred to, reverses the above operation and closes the pump-valve. It will be seen, therefore, that the apparatus is perfectly automatic, that it has very little mechanism, that the mechanism illustrated is simple and positive in operation, and that by making the trap serve as a support for the pump the latter is in a very accessible position where all its parts can be easily reached and where an easy connection can be made between it and the trap.

While I have shown and described an open float in the trap, this being the preferred form of structure, still it is evident that with a pump supported on the trap as a base various forms of float could be used without affecting the principle of the invention, and I therefore do not limit myself to the open or any form of float.

Having thus described my invention, I claim as new and desire to secure by Letters Patent—

1. An apparatus of the character described comprising a pump, and a trap serving as a base to support the pump above the trap, said trap having an open float within it, a pipe connection between the trap and pump, a counterbalanced shaft journaled in the trap, a crank-and-lever connection between the float and the shaft, and a crank-and-lever connection between the steam-valve of the pump and the outer end of the shaft whereby the rise and fall of the float opens and closes the said valve, substantially as described.

2. The combination with a trap having a removable cover and laterally-extending arms or supports at the upper portion thereof below said cover, of a pump carried by the arms so as to extend across and above the trap free of the cover, a pipe connection between the trap and pump, and means for stopping and starting the pump by the rise and fall of water in the trap.

3. A trap comprising a shell having a suitable inlet, a vertically-movable open-topped float suitably guided within the shell, a discharge-pipe leading from within the float out through the shell, a shaft journaled in and having one end passing through the trap, a crank carried by the shaft within the shell, a rod pivoted to the bottom of the float and to the shaft, a counterbalance for the float, and an operative valve-working mechanism outside the trap connected with and operated by the rise and fall of the float.

4. The combination with a pump, of a trap having an inlet, an open-topped float in the trap, a discharge-pipe leading from the float to the pump, a shaft, a crank carried by the shaft within the shell, a rod pivoted to the bottom of the float and to the shaft, a counterbalance for the float carried by the shaft, a second crank carried by the outer end of the shaft, and a rod-and-lever mechanism connecting the last-mentioned crank with the steam-valve of the pump whereby the rise and fall of the float controls the valve.

5. The herein-described trap, comprising a shell having a suitable inlet, a vertically-movable open-topped float suitably guided within the shell, a discharge-pipe leading from within the float out through the shell, a shaft, a crank carried by the shaft within the shell, a rod pivoted to the bottom of the float and to the shaft, a counterbalance for the float carried by the shaft, a second crank carried by the outer end of the shaft, and a rod connected to the crank and adapted to operate a valve of a pump by the rise and fall of the float, substantially as described.

WILLIAM FOSTER.

Witnesses:
A. W. STANLEY,
J. A. E. CRISWELL.